(12) United States Patent
Kung et al.

(10) Patent No.: US 12,366,682 B2
(45) Date of Patent: Jul. 22, 2025

(54) DISPLAY DEVICE

(71) Applicant: AUO Corporation, Hsin-Chu (TW)

(72) Inventors: Shu-Cheng Kung, Hsin-Chu (TW);
Ya-Chen Kao, Hsin-Chu (TW);
Ken-Yu Liu, Hsin-Chu (TW)

(73) Assignee: AUO CORPORATION, Hsin-Chu (TW)

( * ) Notice: Subject to any disclaimer, the term of this patent is extended or adjusted under 35 U.S.C. 154(b) by 500 days.

(21) Appl. No.: 17/884,144

(22) Filed: Aug. 9, 2022

(65) Prior Publication Data

US 2023/0221465 A1 Jul. 13, 2023

(30) Foreign Application Priority Data

Jan. 7, 2022 (TW) .................................. 111100835

(51) Int. Cl.
*G02B 1/11* (2015.01)
*G02B 5/30* (2006.01)

(52) U.S. Cl.
CPC .............. *G02B 1/11* (2013.01); *G02B 5/3025* (2013.01)

(58) Field of Classification Search
CPC ................................ G02B 1/11; G02B 5/3025
USPC ......................................................... 359/601
See application file for complete search history.

(56) References Cited

U.S. PATENT DOCUMENTS

| 2002/0085284 | A1 | 7/2002 | Nakamura et al. |
| 2008/0286527 | A1 | 11/2008 | Haga |
| 2010/0027124 | A1 | 2/2010 | Nagahama |
| 2018/0251398 | A1 | 9/2018 | Ikegami et al. |
| 2019/0284091 | A1 | 9/2019 | Ikegami et al. |

FOREIGN PATENT DOCUMENTS

| CN | 101836136 A | 9/2010 | |
| EP | 1962111 A1 | 8/2008 | |
| JP | 2011209717 A | 10/2011 | |
| TW | 200937044 A | 9/2009 | |
| TW | 201718425 A | 6/2017 | |
| WO | WO-2018180541 A1 * | 10/2018 | ............. G02B 1/111 |

OTHER PUBLICATIONS

Translation of WO2018180541 (Year: 2025).*

* cited by examiner

*Primary Examiner* — Jerry L Brooks
(74) *Attorney, Agent, or Firm* — WPAT, PC

(57) ABSTRACT

A display device includes a display module and an anti-glare film on the display module. The anti-glare film includes a first anti-glare layer and a second anti-glare layer. The first anti-glare layer has a plurality of microstructures at an upper surface of the first anti-glare layer. A root-mean-square slope of the microstructures is more than 0 and is 0.2 or less. The second anti-glare layer is between the first anti-glare layer and the display module, and an inner haze of the second anti-glare layer is from 20% to 90%.

19 Claims, 3 Drawing Sheets

DISPLAY DEVICE

CROSS-REFERENCE TO RELATED APPLICATION

This application claims priority to Taiwan Application Serial Number 111100835, filed Jan. 7, 2022, which are herein incorporated by reference in its entirety.

BACKGROUND

Field of Invention

The present disclosure relates to a display device, especially an anti-glare film of the display device.

Description of Related Art

In the progress of display processes, many techniques are applied to the displays to improve user experience for the displays. For example, different types of optical films with different functions may be disposed over the displays to improve the user experience of the displays. One type of optical film is an anti-glare film. The anti-glare film can reduce glare reflected from the display module. Utilizing this anti-glare film can improve the user experience by reducing discomfort found from glare when utilizing a display without an anti-glare optical film.

SUMMARY

Some of the embodiments of the present disclosure provides a display device including a display module and an anti-glare film on the display module. The anti-glare film includes a first anti-glare layer and a second anti-glare layer. The first anti-glare layer has a plurality of microstructures at an upper surface of the first anti-glare layer. A root-mean-square slope of the microstructures is more than 0 and is 0.2 or less. The second anti-glare layer is between the first anti-glare layer and the display module, and an inner haze of the second anti-glare layer is from 20% to 90%.

In some embodiments, a mean length of the microstructures of the first anti-glare layer is from 20 micrometers to 190 micrometers.

In some embodiments, the mean length of the microstructures of the first anti-glare layer is from 30 micrometers to 190 micrometers.

In some embodiments, the mean length of the microstructures of the first anti-glare layer is from 20 micrometers to 30 micrometers.

In some embodiments, a thickness of the first anti-glare layer is greater than a thickness of the second anti-glare layer.

In some embodiments, the thickness of the first anti-glare layer is 1.5 times to 6.5 times the thickness of the second anti-glare layer.

In some embodiments, a thickness of the anti-glare film is from 0.5 millimeters to 1.5 millimeters.

In some embodiments, the second anti-glare layer includes scattering particles.

In some embodiments, the second anti-glare layer is a polarizer.

In some embodiments, the second anti-glare layer is a glue layer.

In some embodiments, the display module further includes a glue layer between the second anti-glare layer and the display module.

In some embodiments, the root-mean-square slope of the microstructures is 0.1 or more and less than 0.2, and the inner haze of the second anti-glare layer is from 20% to 50%.

In some embodiments, a thickness of the anti-glare film is 0.5 millimeters to 0.8 millimeters.

In some embodiments, the root-mean-square slope of the microstructures is more than 0 and is 0.1 or less, and the inner haze of the second anti-glare layer is from 50% to 90%.

In some embodiments, a mean length of the microstructures is 25 micrometers to 190 micrometers.

In some embodiments, a thickness of the anti-glare film is 1 millimeter to 1.5 millimeters.

Some of the embodiments of the present disclosure provides a display device including a display module and an anti-glare film on the display module. The anti-glare film includes a first anti-glare layer and a second anti-glare layer between the first anti-glare layer and the display module. The first anti-glare layer has a plurality of microstructures at an upper surface of the first anti-glare layer, a root-mean-square slope of the microstructures is greater than 0 and is less than or equal to 0.2, and the microstructures have sharp apexes protruding from the upper surface of the first anti-glare layer. An inner haze of the second anti-glare layer is higher than an inner haze of the first anti-glare layer.

In some embodiments, the inner haze of the second anti-glare layer is from 20% to 90%.

In some embodiments, a thickness of the first anti-glare layer is greater than a thickness of the second anti-glare layer.

In some embodiments, the second anti-glare layer comprises scattering particles.

The anti-glare film in some embodiments of the present disclosure includes the first anti-glare layer having the microstructures having particular sizes and the second anti-glare layer having the inner haze within the particular range. The microstructures of the first anti-glare layer are designed based on the inner haze of the second anti-glare layer, such that the sparkles of the anti-glare film are reduced and the anti-glare effect of the anti-glare film is enhanced at the same time. Moreover, the thickness of the first anti-glare layer of the anti-glare film is great enough to protect the surface of the display module from the impact.

It is to be understood that both the foregoing general description and the following detailed description are by examples, and are intended to provide further explanation of the invention as claimed. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
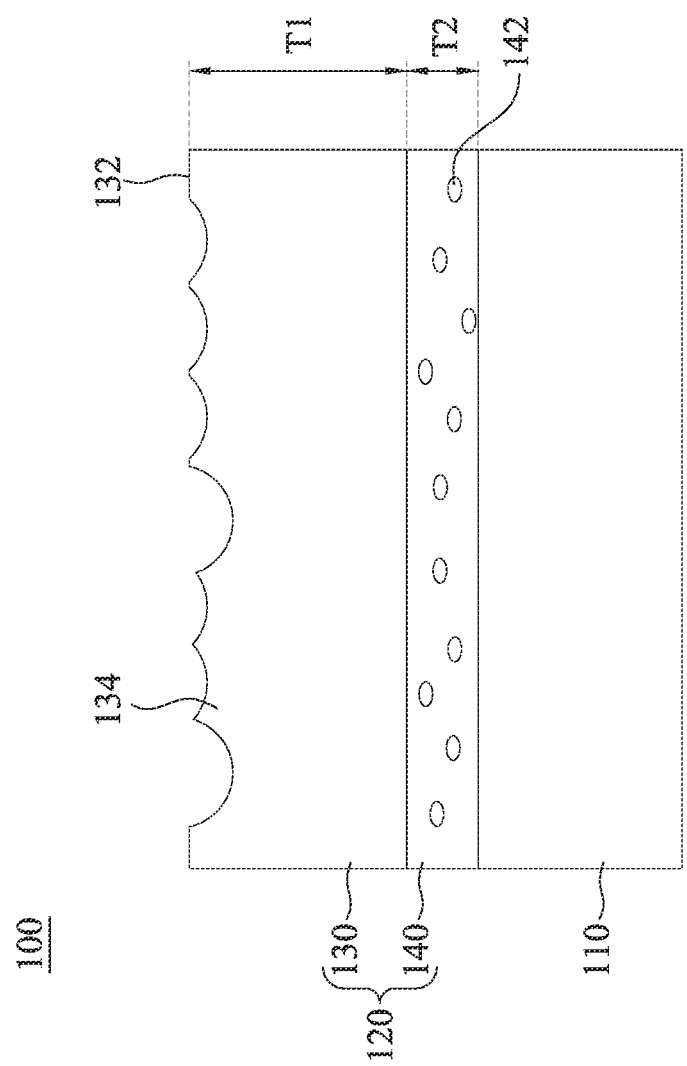
FIG. 1 is a side view of a display device in some embodiments of the present disclosure.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "underlying," "below," "lower," "overlying," "upper" and the like, may be used herein for ease of description to describe one element or feature's relationship to another element(s) or feature(s) as illustrated in the FIGS. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Some embodiments of the present disclosure are related to anti-glare films of display devices. The anti-glare film in some embodiments of the present disclosure has at least two anti-glare layers. One of the anti-glare layers has microstructures for adjusting anti-glare effect of the anti-glare film, while the other anti-glare layer has an inner haze in a particular range to reduce sparkle of the anti-glare film. As such, the anti-glare film in some embodiments of the present disclosure can have an anti-glare effect without forming the sparkle effect.

FIG. 1 is a side view of a display device 100 in some embodiments of the present disclosure. The display device 100 includes a display module 110 and an anti-glare film 120. The display module 110 may be in any suitable forms. In some embodiments, the display module 110 may be a liquid-crystal display (LCD), an organic light-emitting diode (OLED) display, a light-emitting diode (LED) display or other suitable displays.

The anti-glare film 120 is on the display module 110. The anti-glare film 120 includes a first anti-glare layer 130 and a second anti-glare layer 140. The first anti-glare layer 130 is on the second anti-glare layer 140, and the second anti-glare layer 140 is between the first anti-glare layer 130 and the display module 110. The first anti-glare layer has a plurality of microstructures 134 at an upper surface 132 of the first anti-glare layer 132. The microstructures 134 at the upper surface 132 of the first anti-glare layer 130 may be formed by any suitable methods. For example, an etching process may be performed to etch the upper surface 132 of the first anti-glare layer 130, such that the upper surface 132 of the first anti-glare layer 130 has many recesses. Sidewalls of the recesses may define a plurality of the microstructures 134, and the microstructures 134 have different sizes, such as mean length and root-mean-square slope. In some embodiments, the microstructures 134 are defined by the recesses formed in the etching process. Therefore, the microstructures 134 have sharp apexes protruding from the upper surface 132 of the first anti-glare layer 130.

The first anti-glare layer 130 may be formed by any suitable materials, such as glass, transparent resin or the like. The first anti-glare layer 130 may be formed by a single material, and the first anti-glare layer 130 may not be mixed with other materials, such that the first anti-glare layer 130 is a single piece of continuous material. Therefore, a total haze of the first anti-glare layer 130 is determined by the microstructures 134 at the upper surface 132, and the interior part of the first anti-glare layer 130 does not have an inner haze. Alternatively, compared to the surface haze resulting from the microstructures 134, the inner haze of the first anti-glare layer 130 accounting for the total haze of the first anti-glare layer 130 is negligibly low. The term "haze" herein refers to the proportion of the transmitted light intensity deviated from the incident light more than 2.5 degrees to the total transmitted light intensity. The inner haze results from the interior part of the first anti-glare layer 130, and the surface haze results from the surface of the first anti-glare layer 130 (such as microstructures 134). The total haze may be obtained by adding the inner haze and the surface haze.

Figure 3:
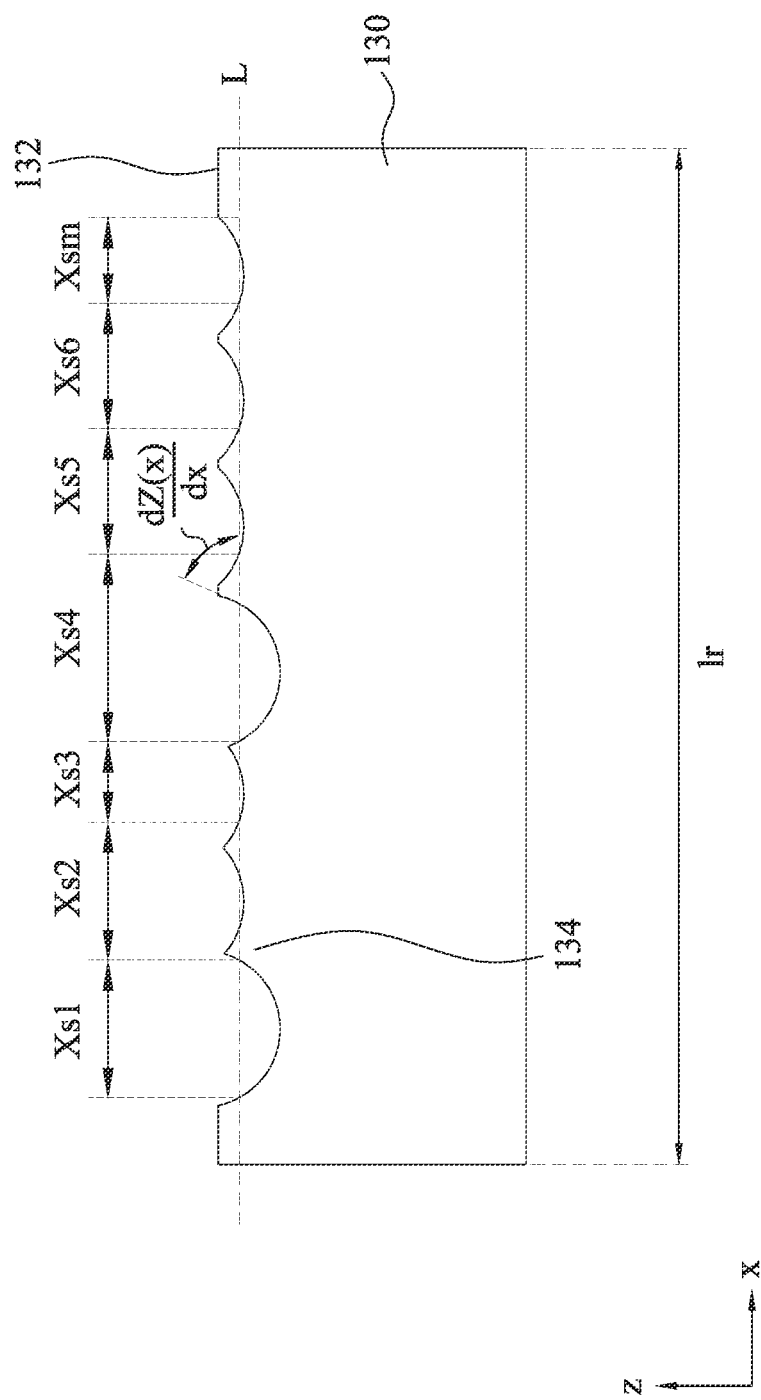
FIG. 3 illustrates an enlargement view of the first anti-glare layer in FIG. 1.

The sizes of the microstructures 134 may be defined by suitable parameters, such as mean length and root-mean-square slope. FIG. 3 illustrates an enlargement view of the first anti-glare layer 130. The mean length of the microstructures 134 may be calculated based on the definition of ISO 4287-1997. Take the upper surface 132 of the first anti-glare layer 130 as an example, the upper surface 132 is divided into several intervals, and each interval has a length Xs1, Xs2, Xs3, Xs4, Xs5, Xs6, ..., Xsm respectively. The dashed line L represents the average level of the microstructures 134. The mean length (Rsm) of the microstructures 134 may be calculated according to the following formula:

$$RSm = \frac{1}{m}\sum_{i=1}^{m} Xsi.$$

Moreover, the root-mean-square slope of the microstructures 134 may be calculated based on the definition of ISO 4287-1997. Take the upper surface 132 of the first anti-glare layer 130 as an example; each location of the upper surface 132 has a slope dZ(x)/dx. The root-mean-square slope (RΔq) of the microstructures 134 within a base length Ir may be calculated according to the following formula:

$$R\Delta q = \sqrt{\frac{1}{Ir}\int_0^{Ir}\left[\frac{dZ(x)}{dX}\right]^2 dx}.$$

Back to FIG. 1, anti-glare properties of the first anti-glare layer 130 may be adjusted by adjusting the mean length and the root-mean-square slope of the microstructures 134. In some embodiments, the mean length of the microstructures 134 of the first anti-glare layer 130 is 20 micrometers to 190 micrometers, and the root-mean-square slope of the microstructures 134 of the first anti-glare layer 130 is more than 0 and is 0.2 or less. When the mean length of microstructures 134 is greater than 20 and less than 30 micrometers, the upper surface 132 of the first anti-glare layer 130 is more uniform. It is difficult to form sparkles, which results from uneven light mixing, to make users feel unwell when using the anti-glare film 120 to read. When the mean length of microstructures 134 is greater than 30 micrometers, the sparkles are more obvious, but the anti-glare effect is better. If the root-mean-square slope of the microstructures 134 is greater than 0.2, the light scattering from the upper surface 132 may increase and the haze of the first anti-glare layer 130 also increases. Therefore, the images users see may be blurry.

To reduce the sparkles and provide better anti-glare effect at the same time, the second anti-glare layer 140 is disposed between the first anti-glare layer 130 and the display module 110 in the present disclosure. The second anti-glare layer 140 is used to adjust the inner haze of the anti-glare film 120 based on the sizes of the microstructures 134 of the first anti-glare layer 130. The second anti-glare layer 140 has scattering particles 142 therein. The scattering particles 142 may be the particles having refractive index different from the material of the second anti-glare layer 140. The scattering particles 142 may also be the particles which the surfaces thereof may lead to reflection or scattering effect. Suitable number of the scattering particles 142 may be disposed in the second anti-glare layer 140, such that the second anti-glare layer 140 has a suitable inner haze. In some embodiments, the inner haze of the second anti-glare layer 140 is from 20% to 90%.

Figure 2:
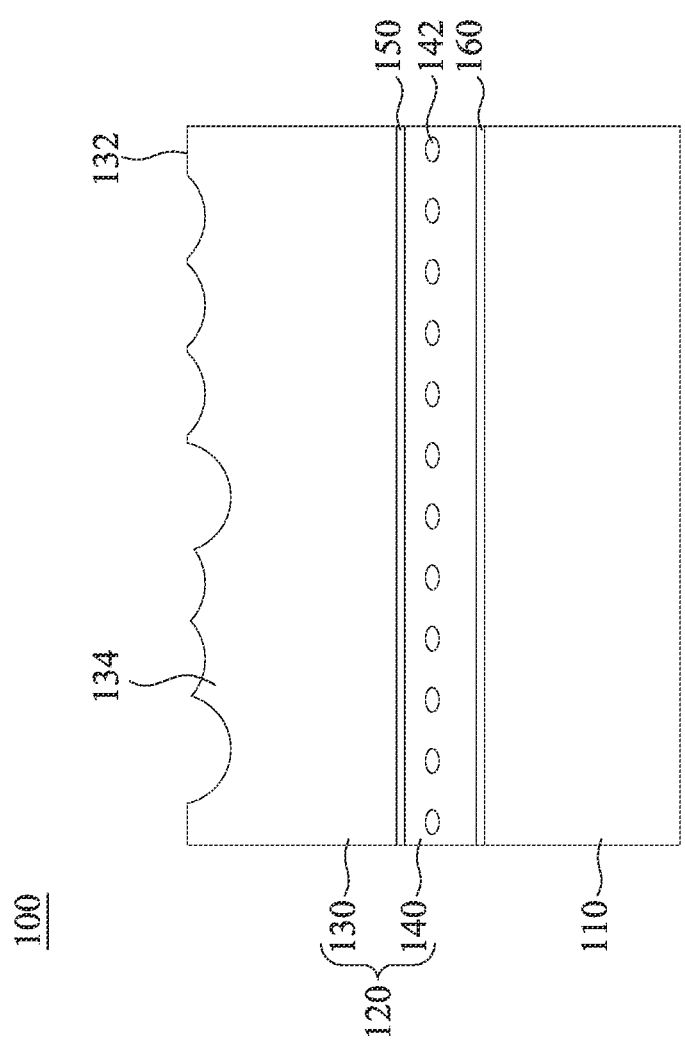
FIG. 2 is a side view of a display device in some other embodiments of the present disclosure.

The second anti-glare layer 140 may be in any suitable forms. In some embodiments, as shown in FIG. 1, the second anti-glare layer 140 is a glue layer. The first anti-glare layer 130 may be adhered to the display module 110 by the second anti-glare layer 140. When the second anti-glare layer 140 is a glue layer, the scattering particles 142 may be evenly dispersed in the second anti-glare layer 140. In some embodiments, as shown in FIG. 2, the second anti-glare layer 140 may be a polarizer, and the anti-glare film 120 may include a first glue layer 150 and a second glue layer 160. The first anti-glare layer 130 may be adhered to the second anti-glare layer 140 by the first glue layer 150, and the second anti-glare layer 140 may be adhered to the display module 110 by the second glue layer 160. When the second anti-glare layer 140 is a polarizer, the scattering particles 142 may near the surface of the first anti-glare layer 130. For example, the second anti-glare layer 140 may be a multilayer structure, and one of the layers (such as the upmost layer) of the second anti-glare layer 140 may include scattering particles 142.

The thickness T1 of the first anti-glare layer 130 and the sizes of the microstructures 134 may be adjusted based on the inner haze of the second anti-glare layer 140. In some embodiments, the second anti-glare layer 140 may concentrate on reducing the sparkle issue of the anti-glare film 120, and the first anti-glare layer 130 may concentrate on enhance the anti-glare effect of the anti-glare film 120. The second anti-glare layer 140 has high inner haze, (such as 20% to 90%), such as the inner haze of the second anti-glare layer 140 is higher than the inner haze of the first anti-glare layer 130, to reduce the sparkle issue. In some embodiments, the thickness T2 of the second anti-glare layer 140 is thin. The scattering particles 142 of the second anti-glare layer 140 are also near the surface of the display module 110. As such, the second anti-glare layer 140 having high inner haze does not make the images users see become blurry. In some embodiments, the thickness T2 of the second anti-glare layer 140 is 0.2 millimeters or less, and in different embodiments of the present disclosure, the difference between the thicknesses of the second anti-glare layers 140 is little.

When the location of the second anti-glare layer 140 is near the surface of the display module 110, the thickness of the first anti-glare layer 130 and the sizes of the microstructures 134 is more unrestricted. The thickness of the first anti-glare layer 130 and the microstructures 134 may be further designed based on the anti-glare effect of the anti-glare film 120. In some embodiments, when the inner haze of the second anti-glare layer 140 is higher, the thickness of the first anti-glare layer 130 and the mean length of the microstructures 134 are greater, and the root-mean-square slope of the microstructures 134 is smaller.

Specifically, when the inner haze of the second anti-glare layer 140 is lower, the microstructures 134 of the first anti-glare layer 130 also have a function of reducing the sparkles of the anti-glare film 120. Therefore, the microstructures 134 have smaller mean length and larger root-mean-square slope. The thickness of the first anti-glare layer 130 is also less to form the anti-glare film 120 with anti-glare properties and less sparkle issue at the same time. In some embodiments, when the inner haze of the second anti-glare layer 140 is from 20% to 50%, the root-mean-square slope of the microstructures 134 is 0.2 or less and 0.1 or more. The thickness of the anti-glare film 120 is from about 0.5 millimeters to about 0.8 millimeters, the mean length of the microstructures 134 is from about 20 micrometers to about 80 micrometers. When the inner haze of the second anti-glare layer 140 is higher, the second anti-glare layer 140 may further reduce the sparkle issue of the anti-glare film 120, such that the microstructures 134 of the first anti-glare layer 130 may be mainly designed for enhancing the anti-glare effect of the anti-glare film 120. Therefore, the microstructures 134 have greater mean length and smaller root-mean-square slope. The thickness of the first anti-glare layer 130 is also greater to form the anti-glare film 120 with anti-glare properties and less sparkle issue at the same time. In some embodiments, when the inner haze of the second anti-glare layer 140 is from 50% to 90%, the root-mean-square slope of the microstructures 134 is greater than 0 and is 0.1 or less. The thickness of the anti-glare film 120 is from about 1 millimeter to about 1.5 millimeters, and the mean length of the microstructures 134 is from about 25 micrometers to about 190 micrometers. It is noted that "the thickness of the anti-glare film 120" described in the present disclosure refers to the sum of the thickness of the first anti-glare layer 130 and the second anti-glare layer 140. If the first glue layer 150 is presented, the thickness of the first glue layer 150 is negligible. In some embodiments, the thickness of the anti-glare film 120 is from about 0.5 millimeters to about 1.5 millimeters.

In some embodiments, the inner haze of the anti-glare film 120 concentrates in the second anti-glare layer 140, such that the thickness T2 of the second anti-glare layer 140 is thinner. The first anti-glare layer 130 may be designed to have a larger thickness T1, and the thickness of the first anti-glare layer 130 is greater than the thickness of the second anti-glare layer 140. In some embodiments, the thickness of the first anti-glare layer 130 is about 1.5 times to about 6.5 times the thickness of the second anti-glare layer 140. The thickness of the first anti-glare layer 130 is great enough to protect the surface of the display module 110 from the impact. When the thickness of the first anti-glare layer 130 is less than 1.5 times the thickness of the second anti-glare layer 140, the thickness of the anti-glare film 120 may be too small to prevent the surface of the display module 110 from the damage caused by the impact. When the first anti-glare layer 130 is greater than 6.5 times the second anti-glare layer 140, the thickness of the anti-glare film 120 may be too great, such that the anti-glare film 120 may disturb users when using the display device 100 due to poor picture clarity.

As mentioned above, the anti-glare film in some embodiments of the present disclosure has some advantages. Specifically, the anti-glare film in some embodiments of the present disclosure includes the first anti-glare layer having the microstructures having particular sizes and the second anti-glare layer having the inner haze within the particular range. The microstructures of the first anti-glare layer are designed based on the inner haze of the second anti-glare layer, such that the sparkles of the anti-glare film are reduced and the anti-glare effect of the anti-glare film is enhanced at the same time. Moreover, the thickness of the first anti-glare layer of the anti-glare film is great enough to protect the surface of the display module from the impact.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display device, comprising:
   a display module; and
   an anti-glare film on the display module, wherein the anti-glare film comprises:
   a first anti-glare layer, wherein the first anti-glare layer has a plurality of microstructures at an upper surface of the first anti-glare layer, a root-mean-square slope of the microstructures is more than 0 and is less than or equal to 0.2, wherein a mean length of the microstructures of the first anti-glare layer is from 20 micrometers to 190 micrometers; and
   a second anti-glare layer between the first anti-glare layer and the display module, wherein an inner haze of the second anti-glare layer is from 20% to 90%.

2. The display device of claim 1, wherein the mean length of the microstructures of the first anti-glare layer is from 30 micrometers to 190 micrometers.

3. The display device of claim 1, wherein the mean length of the microstructures of the first anti-glare layer is from 20 micrometers to 30 micrometers.

4. The display device of claim 1, wherein a thickness of the first anti-glare layer is greater than a thickness of the second anti-glare layer.

5. The display device of claim 4, wherein the thickness of the first anti-glare layer is at least 1.5 times to 6.5 times the thickness of the second anti-glare layer.

6. The display device of claim 1, wherein a thickness of the anti-glare film is from 0.5 millimeters to 1.5 millimeters.

7. The display device of claim 1, wherein the second anti-glare layer comprises scattering particles.

8. The display device of claim 1, wherein the second anti-glare layer is a polarizer.

9. The display device of claim 1, wherein the second anti-glare layer is a glue layer.

10. The display device of claim 1, wherein the display module further comprises a glue layer between the second anti-glare layer and the display module.

11. The display device of claim 1, wherein the root-mean-square slope of the microstructures is less than 0.2 and is greater than or equal to 0.1, and the inner haze of the second anti-glare layer is from 20% to 50%.

12. The display device of claim 11, wherein a thickness of the anti-glare film is 0.5 millimeters to 0.8 millimeters.

13. The display device of claim 1, wherein the root-mean-square slope of the microstructures is greater than 0 and is less than or equal to 0.1, and the inner haze of the second anti-glare layer is from 50% to 90%.

14. The display device of claim 13, wherein a mean length of the microstructures is 25 micrometers to 190 micrometers.

15. The display device of claim 13, wherein a thickness of the anti-glare film is 1 millimeter to 1.5 millimeters.

16. A display device, comprising:
   a display module; and
   an anti-glare film on the display module, wherein the anti-glare film comprises:
   a first anti-glare layer, wherein the first anti-glare layer has a plurality of microstructures at an upper surface of the first anti-glare layer, a root-mean-square slope of the microstructures is greater than 0 and is less than or equal to 0.2, wherein a mean length of the microstructures of the first anti-glare layer is from 20 micrometers to 190 micrometers, and the microstructures have sharp apexes protruding from the upper surface of the first anti-glare layer; and
   a second anti-glare layer between the first anti-glare layer and the display module, wherein an inner haze of the second anti-glare layer is higher than an inner haze of the first anti-glare layer.

17. The display device of claim 16, wherein the inner haze of the second anti-glare layer is from 20% to 90%.

18. The display device of claim 16, wherein a thickness of the first anti-glare layer is greater than a thickness of the second anti-glare layer.

19. The display device of claim 16, wherein the second anti-glare layer comprises scattering particles.

* * * * *